UNITED STATES PATENT OFFICE.

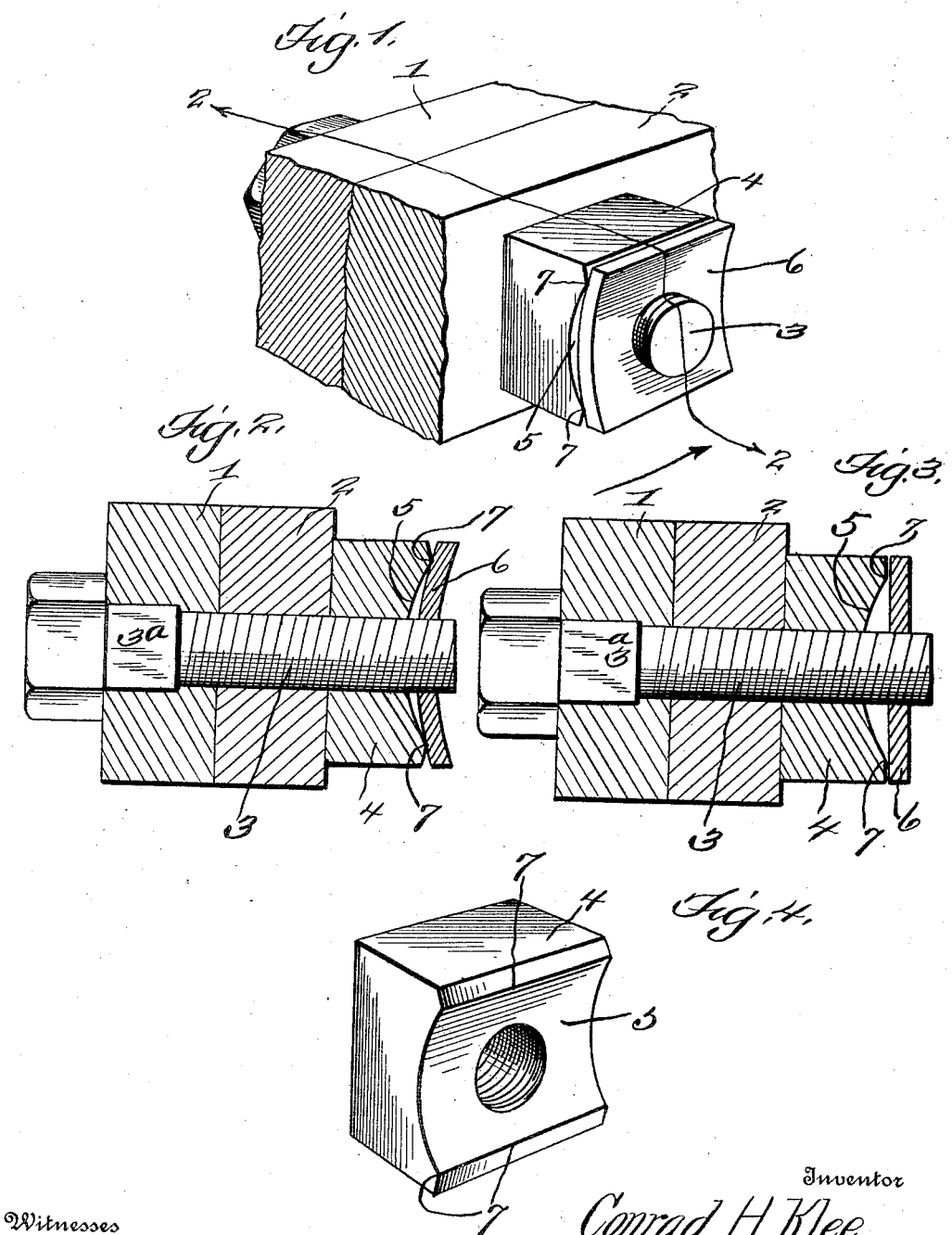

CONRAD H. KLEE, OF HONESDALE, PENNSYLVANIA.

NUT-LOCK.

1,067,873.　　　　　Specification of Letters Patent.　　Patented July 22, 1913.

Application filed March 22, 1913. Serial No. 756,177.

*To all whom it may concern:*

Be it known that I, CONRAD H. KLEE, a citizen of the United States, residing at Honesdale, in the county of Wayne and State of Pennsylvania, have invented a new and useful Nut-Lock; and I do hereby declare the following to be a full, clear, and exact description of the invention, such as will enable others skilled in the art to which it appertains to make and use the same.

This invention relates to a new and useful nut locking device.

Very often the nuts upon railroads, and in other industries, more or less work loose. Therefore it is the object of the invention to overcome such a disadvantage.

To overcome the loosening of nuts, it is the aim to construct the nut with a concavity or depression on one face. In this case the nut when applied to the bolt has its concavity facing outwardly, and after the nut has been screwed home, a resilient spring steel disk nut is applied or screwed upon the extremity of the bolt. In screwing the disk nut in place sufficient force is necessary, in order to cause the disk nut to dish, whereby the same will partly conform to the contour of the concavity of the first nut and frictionally engage and lock against a shoulder of the same. In this manner the first nut and the disk nut tend to expand apart, thereby locking in engagement with the threads of the bolt, so as to securely lock the nut in place.

In practical fields it may be found necessary to subject the construction of the improved nut locking device to alterations, provided the alterations fall within the scope of what is claimed.

The invention comprises further features and combination of parts, as hereinafter set forth, shown in the drawings and claimed.

In the drawings:—Figure 1 is a view in perspective of a nut, showing the same locked in position by the improved nut locking device constructed in accordance with the invention. Fig. 2 is a sectional view on line 2—2 of Fig. 1. Fig. 3 is a sectional view similar to Fig. 2, showing the normal condition of the disk nut, prior to being screwed home on the bolt. Fig. 4 is a detail view of the nut 4.

Referring more particularly to the drawings 1 and 2 designate two members or objects adapted to be clamped together. Extending through the members is a bolt 3 having a rectangular portion $3^a$ to prevent the bolt from turning. Threaded upon the end of the bolt is a nut 4, one of the faces of which is provided with a trough-shaped concavity or depression 5. In other words one face of the nut from substantially one edge to an opposite edge is scooped out. Adjacent two opposite edges of the nut 4, the scooped out portion terminates in angular corner shoulders 7, with which the disk nut 6 contacts, which disk nut is threaded on said bolt. These sharp corner shoulders 7 extend parallel with the scooped out portion or concavity, and are designed to bite into the disk nut.

After applying the bolt as shown in the drawings with nut 4 screwed home, the disk nut is then screwed in place until it frictionally engages the angular sharp shoulder 7, but not enough to distort the disk nut. To firmly lock the bolt and the nut 4, a turn from a quarter to substantially three-quarters or a whole turn may be imparted to the disk nut, by the use of a wrench, thereby causing the disk nut to frictionally and firmly bind against the sharp angular shoulders 7, and at the same time cause the disk nut to dish, in order to partly conform to the concavity, or scooped out portion.

A particular feature of the invention is the strength of the lock, for instance the resilient or spring disk nut can be run up to a position, without a wrench, until it engages said shoulders 7, that is, without dishing the disk nut, then subsequently by imparting substantially anywhere from a quarter or a half turn to the disk nut, with an eighteen inch wrench, will lock the disk nut against a force of one hundred lbs. This applies to a one inch nut in combination with a three-sixteenths inch thick resilient or spring disk nut, in conjunction with a bolt minus the rectangular or square portion $3^a$, thereby locking upon the threads only. This force will, of course vary with different sizes of bolts. The ease with which the disk nut or the nut 4 can be run on and off, renders the device a great time saver. Furthermore the simplicity, desirability, strength, practicability and efficiency, as well as the low cost of manufacture, enhance the value and utility of the device greatly. Furthermore the disk nut may be used a great number of times without undue wear or impairing the locking feature. For instance, from constant use the disk nut becomes partly dished when not upon the bolt, the disk nut may be reversed, and then if it becomes dished from constant use, it may be again reversed. This feature of the device can be repeated almost indefinitely.

The invention having been set forth what is claimed as new and useful is:—

In combination with a bolt, a nut on said bolt having one of its faces provided with a trough shaped concavity terminating in biting shoulders at two opposite edges of the nut, a spring disk nut threaded on the bolt, adapted to be screwed toward the first nut in such wise as to cause said shoulders to bite therein and at the same time dishing the spring nut, said bolt including means preventing its turning.

In testimony whereof I have signed my name to this specification in the presence of two subscribing witnesses.

CONRAD H. KLEE.

Witnesses:
 F. H. EISELE,
 JAMES REILLY.

Copies of this patent may be obtained for five cents each, by addressing the "Commissioner of Patents, Washington, D. C."